United States Patent [19]

Sandt

[11] Patent Number: 5,004,574
[45] Date of Patent: Apr. 2, 1991

[54] METHOD OF MAKING A COMPOSITE STRUCTURAL ELEMENT

[76] Inventor: Hartley Sandt, 2425 Dogwood La., Orange Park, Fla. 32073

[21] Appl. No.: 138,151

[22] Filed: Dec. 28, 1987

[51] Int. Cl.$^5$ ............................................. B29C 39/10
[52] U.S. Cl. ..................................... 264/101; 264/257; 264/275; 264/277; 264/279.1; 264/295; 264/296; 264/339
[58] Field of Search ............... 264/257, 258, 1.5, 45.8, 264/36, 339, 101, 275, 277, 279.1, 295, 296

[56] References Cited

U.S. PATENT DOCUMENTS

| | | | |
|---|---|---|---|
| 2,818,606 | 1/1958 | White | 425/71 |
| 4,312,917 | 1/1982 | Hawley | 264/275 |
| 4,409,154 | 10/1983 | Grenat | 264/1.5 |
| 4,456,401 | 6/1984 | Williams | 264/36 |
| 4,548,664 | 10/1985 | Canivet | 264/1.5 |
| 4,564,487 | 1/1986 | Bennett | 264/45.8 |
| 4,676,942 | 6/1987 | Ollivier | 264/257 |
| 4,741,684 | 5/1988 | Cornelison | 425/126.1 |
| 4,773,450 | 9/1988 | Stanley | 264/257 |

*Primary Examiner*—Jay H. Woo
*Assistant Examiner*—Jeremiah F. Durkin, II
*Attorney, Agent, or Firm*—Arthur G. Yeager

[57] ABSTRACT

A method of making an elongated structural element of fiber reinforced plastic material with a solid walled casing. A hollow tubular casing is generally simultaneously filled with elongated strands of continuous fibrous reinforcement and plastic material and solidified. The casing is part of the final product. An internal casing may also be used where the fiber reinforced plastic is between the internal and external casings. The elongated structural element may be initially shaped prior to solidification or after reheating reshaped into another shape such as a helical coil or spring.

15 Claims, 2 Drawing Sheets

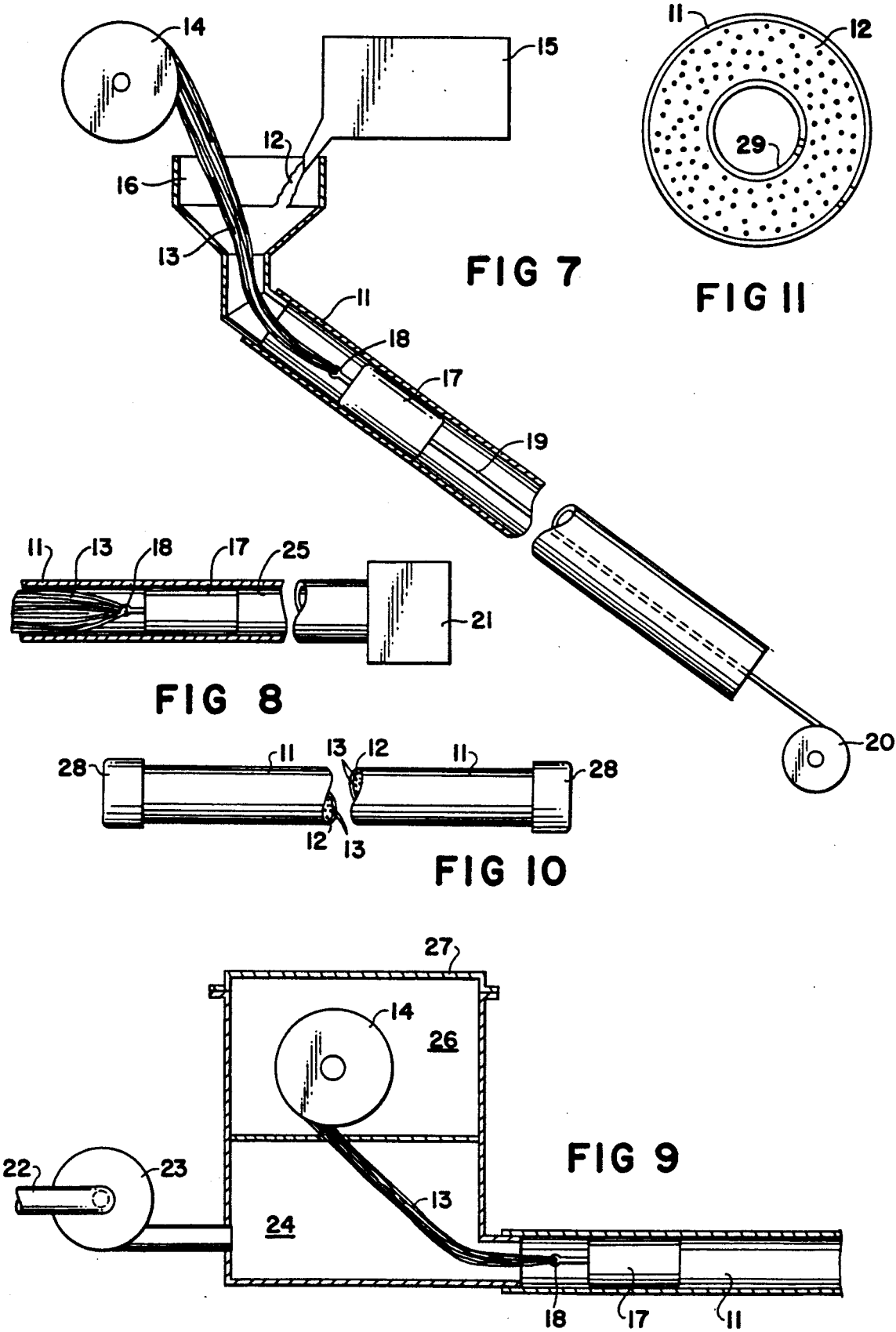

METHOD OF MAKING A COMPOSITE STRUCTURAL ELEMENT

BACKGROUND OF THE INVENTION

Structural elements such as rods, tubes, and beams are normally made by casting, extruding, or rolling techniques to produce plastic or metal tubing, sheets, rods, beams, and the like. These structural elements normally comprise a single material which is chosen for its combination of physical properties, e.g., strength and weight, as well as corrosion resistance, color, and texture. Plastic molding and extrusion procedures have provided the possibility of preparing plastic structural elements with selected combinations of physical properties, chemical properties, color, texture, etc. Fiber reinforcement of plastic materials has provided much higher physical strength properties than the plastic material alone could offer. In general, these fiber reinforced materials are made by extruding through a die a plastic melt having continuous strands of fiber distributed therein. The extrudate is then solidified in the form of a continuous rod, beam, or strand and can be cut into whatever length is desired for use. The disadvantages of the prior art procedures are (1) that the extrudate can not be made into a curved or non-linear article, and (2) the surface properties at the extrudate cannot be changed from that inherent in the extruded plastic.

It is an object of this invention to provide a novel structural element of fiber reinforced plastic material. It is another object of this invention to provide methods for manufacturing such structural elements. Still other objects will be apparent from the more detailed description which follows.

BRIEF SUMMARY OF THE INVENTION

This invention relates to a structural element comprising an elongated solid or tubular member having a substantially identical cross section over its entire length, the element having a solid core of thermoplastic or thermosetting resin embedded in which is a plurality of substantially parallel elongated strands of lengthwise fiber reinforcement material and a continuous casing around the core of a plastic material.

This invention also relates to a process for preparing an elongated structural element comprising:

(1) preparing a hollow tubular solid casing of a flexible, semiflexible, or rigid material;

(2) filling the interior of the casing with a plastic material in liquid form;

(3) distributing throughout said plastic material a plurality of elongated strands of fiber reinforcement material substantially parallel to each other and extending lengthwise of the casing; and (4) allowing the plastic material to solidify with the strands of fiber reinforcement material embedded therein.

BRIEF DESCRIPTION OF THE DRAWINGS

The novel features which are believed to be characteristic of this invention are set forth with particularity in the appended claims. The invention itself, however, both as to its organization and method of operation, together with further objects and advantages thereof, may best be understood by reference to the following description taken in connection with the accompanying drawings in which:

FIG. 7 is a schematic illustration of one embodiment of the process of this invention;

FIG. 8 is a schematic illustration of a second embodiment of the process of this invention;

FIG. 9 is a schematic illustration of a third embodiment of the process of this invention;

FIG. 10 is a schematic illustration of the structural element of this invention with end caps attached; and FIG. 11 is an end elevational view similar to FIG. 2 except to show a hollow form of the structural element of this invention.

DETAILED DESCRIPTION OF THE INVENTION

This invention relates to a novel article of manufacture which is shown in FIGS. 1-6 of the attached drawings, and to a process for preparing the article of manufacture which is shown in FIGS. 7-9.

Figure 1:
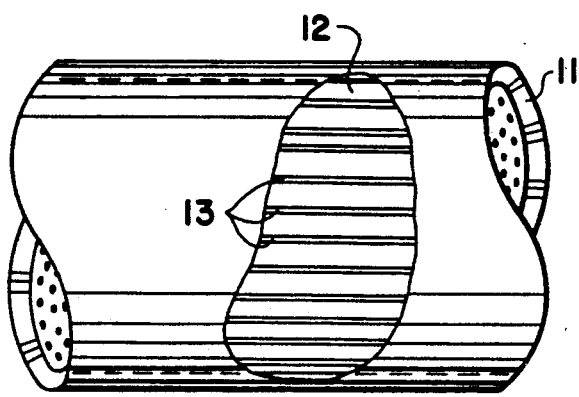
FIG. 1 is a side elevational view of one embodiment of the structural element of this invention.
Figure 2:
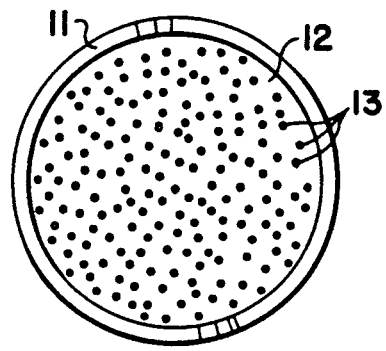
FIG. 2 is an end elevational view of the structural element of this invention in FIG. 1.

In FIGS. 1-6 there are depicted four types of structural elements employing this invention. In FIGS. 1-2 there is shown a cylindrical rod element having three components; namely, a casing 11, an internal binder 12, and strands 13 of fiber reinforcement material. These are all joined together into a single unitary structure which has an indefinite length and a substantially similar cross section at any place along that length.

Casing 11 is a flexible, semiflexible, or rigid pipe or tubing having whatever properties are important for the eventual use of the structural element. If corrosion resistance is important, casing 11 must provide that property; and so on for other property requirements. Generally, casing 11 should be a flexible or semiflexible thermoplastic material which is compatible with binder 12 and does not react chemically therewith. In other embodiments casing 11 may be a metallic tube, an animal or human vein, intestine, or the like. Preferably there is no bond between the two although in certain embodiments binder 12 and casing 11 may be bonded to each other. Typical materials for casing 11 include polyolefins, polyvinyls, polyesters, polyacetals, polyacrylics, polyamides, polyfluorocarbons, polycarbonates, and other plastics of similar properties, aluminum, human or animal tissue, and the like.

The internal space in casing 11 is filled with binder 12 and fiber reinforcement 13. Binder 12 must be capable of tightly adhering to strands 13. Preferably, binder 12 should be available in liquid form for ease in manufacturing the structural element of this invention, and capable of being transformed into solid form at ambient conditions for use as binder 13 in the structural element in ordinary use. Binder 13 may be a thermoplastic or a thermosetting material, each of which exists in both liquid and solid forms. The thermoplastic materials normally change from liquid to solid and from solid to liquid by temperature changes. Thermosetting materials normally involve two or more starting components which are mixed together to produce a liquid which is hardened by chemical reaction between the components and cannot later be liquefied. Typical thermoplastics include polyolefins, polyesters, polyvinyls, polyacetals, polyacrylics, polyamides, polyfluorocarbons, polycarbonates, and the like. Typical thermosetting binders include phenol-formaldehyde resins, melamine resins, epoxy resins, urea-formaldehyde resins, polyesters, and the like.

The fiber reinforcement material 13 is a plurality of strands of fiber or filament that are distributed throughout the binder and ar in substantially parallel arrangement running lengthwise of the structural element. The strands may be in a linear arrangement or in a sinuous or helical arrangement so long as they remain parallel to each other. Ideally, the strands 13 would be separated from each other and equally distributed throughout all of the binder 12. From a practical point or view this may not be achieved, but preferably, the strands are extended lengthwise throughout the structural element and distributed as evenly as possible in the binder. The strand 13 may be a single filament or a plurality of filaments twisted together, or may be a single fiber or a plurality of fibers twisted into a thread; or may be any other combination of fibers, filaments, threads, yarns or the like that are relatively small in diameter and relatively long in length. Tubular filaments, threads, yarns and the like are also useful as strands 13. The word "strand" herein is meant to be generic and to include all of the above configurations. The material of the strands may be organic or inorganic. The organic strands include materials such as cotton, wool, bagassee, hemp, polyamide, polyacrylonitrile, polyester, rayon, and the like. Inorganic strands include materials such as glass, steel, copper, aluminum, titanium, and the like.

In order to assure good adhesion between the binder 12 and the strands 13, there may be employed certain promoters or agents to enhance the bonds between binder 12 and strands 13.

Figure 3:
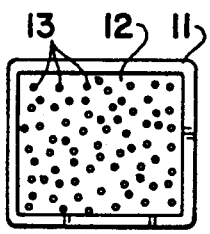
FIG. 3 is an end elevational view of a second embodiment of the structural element of this invention.
Figure 4:
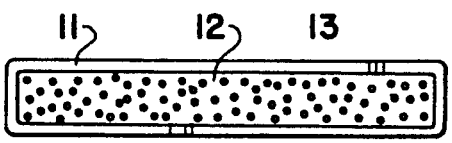
FIG. 4 is an end elevational view of a third embodiment of the structural element of this invention.
Figure 5:
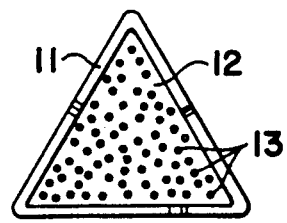
FIG. 5 is an end elevational view of a fourth embodiment of the structural element of this invention.

In FIGS. 3-5 there are shown other structural elements of other cross sectional shapes, e.g., square (FIG. 3), oblong (FIG. 4), and triangular (FIG. 5), which may be solid as shown or internal open space as seen in FIG. 11. Still other shapes are within the scope of this invention since any geometric design is acceptable.

Figure 6:
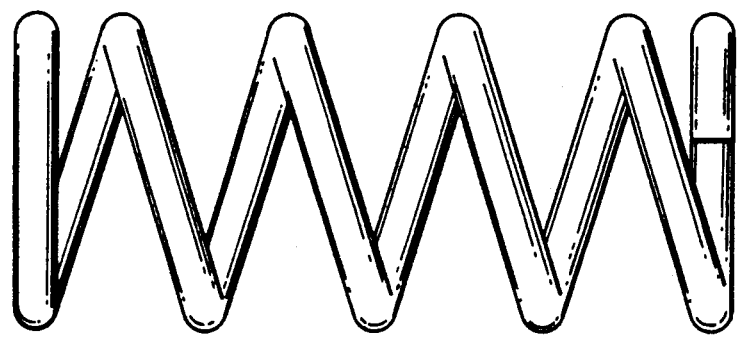
FIG. 6 is a schematic illustration of one type of article, e.g., a coil spring, that can be made from the structural element of this invention.

The structural element of this invention can be sawed, drilled, tapped, twisted, bent, and otherwise used to form useful articles of manufacture. For example, the element may be coiled into a helix to form a coil spring as shown in FIG. 6. If the structural element is made with a thermoplastic binder 12, a preformed straight length of element may be heated, coiled to the appropriate shape, and cooled to solidify the binder 12, and thereby produce a stable coil spring. Alternatively, the element may employ a thermoplastic molten binder 12 in casing 11, and the element may be coiled into a spring before the binder 12 is allowed to solidify. If the binder 12 is a thermosetting material, it is coiled before the binder material has had time to set to a solid, and the result is a stable coil spring. There are a multitude of applications for the structural element of this invention including ropes, rods, structural beams for chemical processing equipment, articles used under sea water, strands used in human surgical procedures, and the like.

In the process of this invention as shown in FIGS. 7-9, a plug 17 is moved through the internal hollow of casing 11 with binder 1 and fiber reinforcement strands 13 filling the hollow behind the plug 17 as it moves along. In the process depicted in FIG. 7, a length of casing 11 is fitted with a feed funnel 16 into which is fed a continuous length of a plurality of strands 13 and at the same time is fed liquid or molten binder 12 from a supply reservoir 15. Plug 17 is slidable within casing 11 and has an eye 18 to which the bank of strands 13 is attached. A pull cable 19 is attached to the front of plug 17 to pull plug 17 through casing 11 by wind up drum 20. As plug 17 is moved downward toward drum 20, binder 13 fills the interior hollow of casing 11 and the individual strands in hank 13 disperse themselves throughout the entire cross section of the interior hollow of casing 11 to eventually approach the distribution shown in FIGS. 2-5. It can be appreciated that casing 11 and plug 17 may take any shape, such as those in FIGS. 2-5. Furthermore, hollow shapes may be made by making plug 17 into a tubular object sliding between inner casing 29 and outer casing 11. If preferred, inner casing may be supported by an internal mandrel to support inner casing against collapse until binder 12 hardens.

In FIG. 8 the same general arrangement as that of FIG. 7 is shown except that instead of a wind up drum 20 and a cable 19 to move plug 17 there is a vacuum pump 21 to produce a lower pressure in the space 25 ahead of plug 17 causing plug 17 to move toward vacuum pump 21.

In FIG. 9 there also is the same general arrangement of casing 11, plug 17 and strands 13, attached to eye 18. In this instance the force to move plug 17 through casing 11 is provided by the pressure on binder 12. Inlet pipe 22 feeds liquid binder 12 to pump 23 which pumps binder into pressure vessel 27 which has an outlet into casing 11. Roll 14 of fiber reinforcement strands 13 is mounted inside vessel 27 in a pressurized space 26 designed to offset the pressure on binder 12 emitted from pump 23. Binder 13 is supplied to space 24 under pressure and this bears against plug 17 causing it to move to the right and fill u casing 11.

In all of the embodiments of FIGS. 7, 8, and 9 the strands will be substantially linear and parallel to each other and to the longitudinal axis of casing 11 if plug 17 is simply pulled through casing 11. If plug 11 is rotated about its axis of travel as it is pulled through casing 11, strands 13 can be made into a sinuous or helical orientation while the individual strands 13 remain generally parallel with each other.

It is contemplated that in certain corrosive conditions there may be a need to completely insulate binder 12 and strands 13 from the surrounding corrosive medium. In such instances there may be end caps 28 sealed onto any cut ends of the structural element so as to leave only the material of the casing exposed as shown in FIG. 10. End cap 28 can be heat sealed or otherwise attached to casing 11 so as to be leak proof and therefore completely corrosion-resistant.

It is an important feature of this invention to provide elements in which the fiber reinforcing component is a continuous strand and not a plurality of chopped fibers. The continuous strands employed in this invention provide a greatly improved modulus of elasticity as compared to that of the strand containing short lengths of reinforcing fibers or filaments. It is for this reason that an excellent coil spring can be made from the structural element of this invention, while such a coil spring from the prior art would not be operable.

While the invention has been described with respect to certain specific embodiments, it will be appreciated that many modifications and changes may be made by those skilled in the art without departing from the spirit of the invention. It is intended, therefore, by the appended claims to cover all such modifications and changes as fall within the true spirit and scope of the invention.

What is claimed as new and what it is desired to secure by Letters Patent of the United States is:

1. A process for preparing an elongated structural element comprising the steps of:
   (1) preparing a hollow external solid walled casing of a tubular material being an integral part of the structural element;
   (2) filling the entire interior of the external casing with a plastic material in liquid form while generally simultaneously distributing throughout the plastic material a plurality of elongated continuous strands of fiber reinforcement material substantially parallel to each other and extending lengthwise of the casing; and
   (3) solidifying the plastic material with the strands of fiber reinforcement material embedded therein.

2. The process of claim 1 further comprising the steps of:
   (4) preparing an internal solid walled casing of a tubular material being an integral part of the structural element and positioning it concentrically inside the external casing; and wherein said step (2) comprises filling the interior between the external and internal casings with the plastic material in liquid form with the strands of fiber reinforcement material distributed therein.

3. The process of claim 1 wherein said step (2) includes moving a plug through the length of the casing while admitting the plastic material and the fiber reinforcement material into the casing behind the moving plug.

4. The process of claim 3 wherein the plug includes a connecting means to which a hank of the fiber reinforcement material is attached in such a manner that the fiber reinforcement material is pulled behind the plug as it moves through the casing.

5. The process of claim 3 wherein the plug is moved by mechanical means.

6. The process of claim 3 wherein the plug is moved by the influence of unequal pressures on the plug resulting from maintaining a vacuum in the casing.

7. The process of claim 3 wherein the plug is moved by maintaining a fluid pressure on the plastic material inside the casing behind the plug.

8. A process for preparing an elongated structural element adapted for use as a coil spring comprising the steps of:
   (A) preparing a hollow tubular corrosion resistant and flexible casing of a first material;
   (B) filling the entire interior of the casing with a plastic material in liquid form while generally simultaneously distributing throughout the plastic material a plurality of elongated continuous strands of fiber reinforcement material substantially parallel to each other and extending lengthwise of the casing; and
   (C) solidifying the plastic material with the strands of fiber reinforcement material embedded therein with the element being adapted to be in the shape of a helical coil.

9. The process of claim 8 wherein said step (B) includes moving a plug through the length of the casing while admitting the plastic material and the fiber reinforcement material into the casing behind the moving plug.

10. The process of claim 9 wherein the plug has a connecting means to which a hank of the fiber reinforcement material is attached in such a manner that fiber reinforcement and plastic materials are pulled behind the plug as it moves through the casing.

11. The process of claim 9 wherein the plug is moved by mechanical means.

12. The process of claim 9 wherein the plug is moved by the influence of unequal pressures on the plug resulting from maintaining a vacuum in the casing.

13. The process of claim 9 wherein the plug is moved by maintaining a fluid pressure on the plastic material inside the casing behind the plug.

14. The process of claim 8 further comprising the steps of:
   (D) forming the element into a helical coil before step (C) is completed.

15. The process of claim 8 further comprising the steps of:
   (D) reheating the element to at least partially liquefy the plastic material;
   (E) forming the element into a helical coil; and
   (F) solidifying the plastic material.

* * * * *